(No Model.) 2 Sheets—Sheet 1.
J. RUNCIMAN.
APPARATUS FOR MANUFACTURING SALT.
No. 491,376. Patented Feb. 7, 1893.
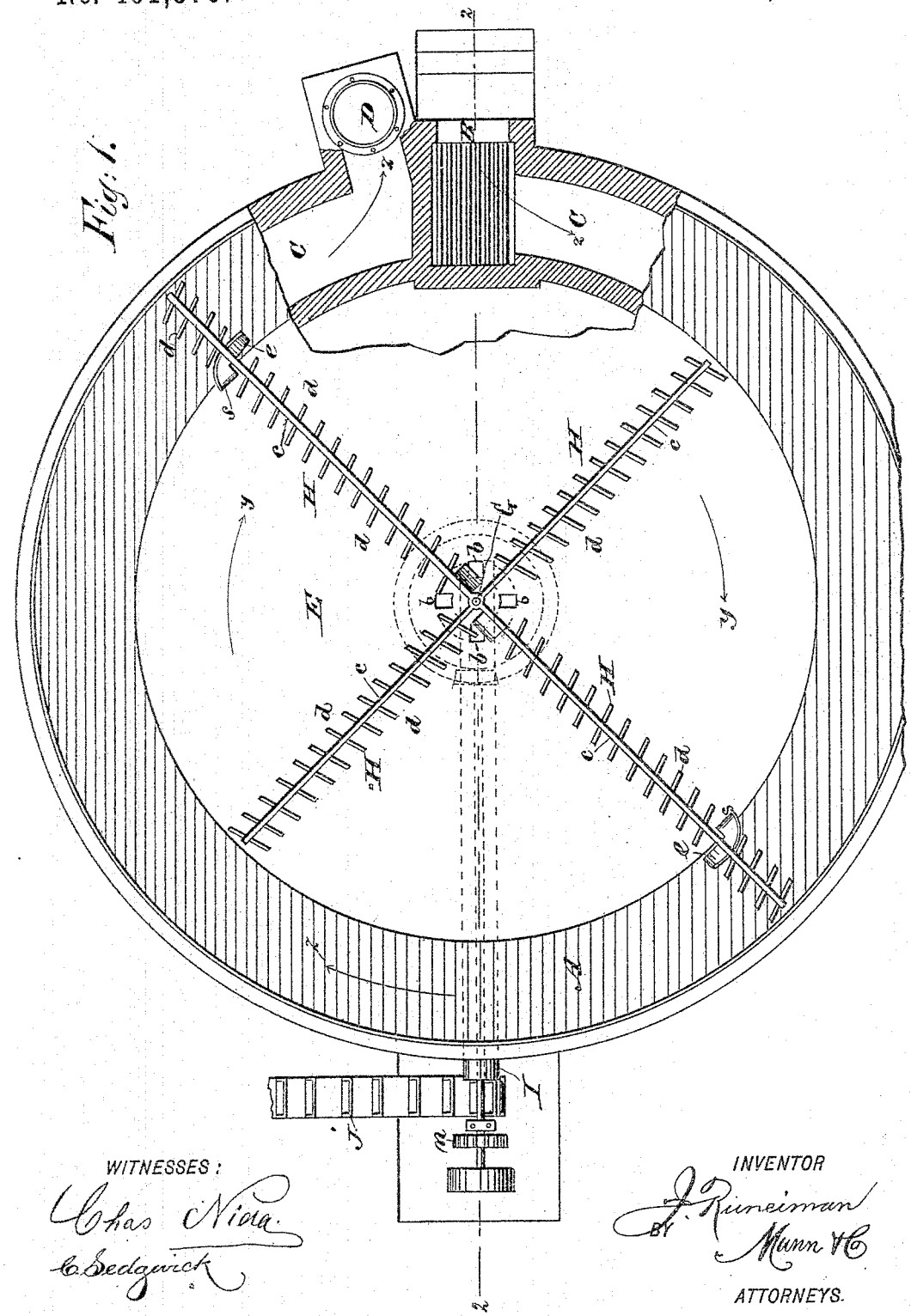
WITNESSES:
Chas Nida
C. Sedgwick
INVENTOR
J. Runciman
BY Munn & Co.
ATTORNEYS.

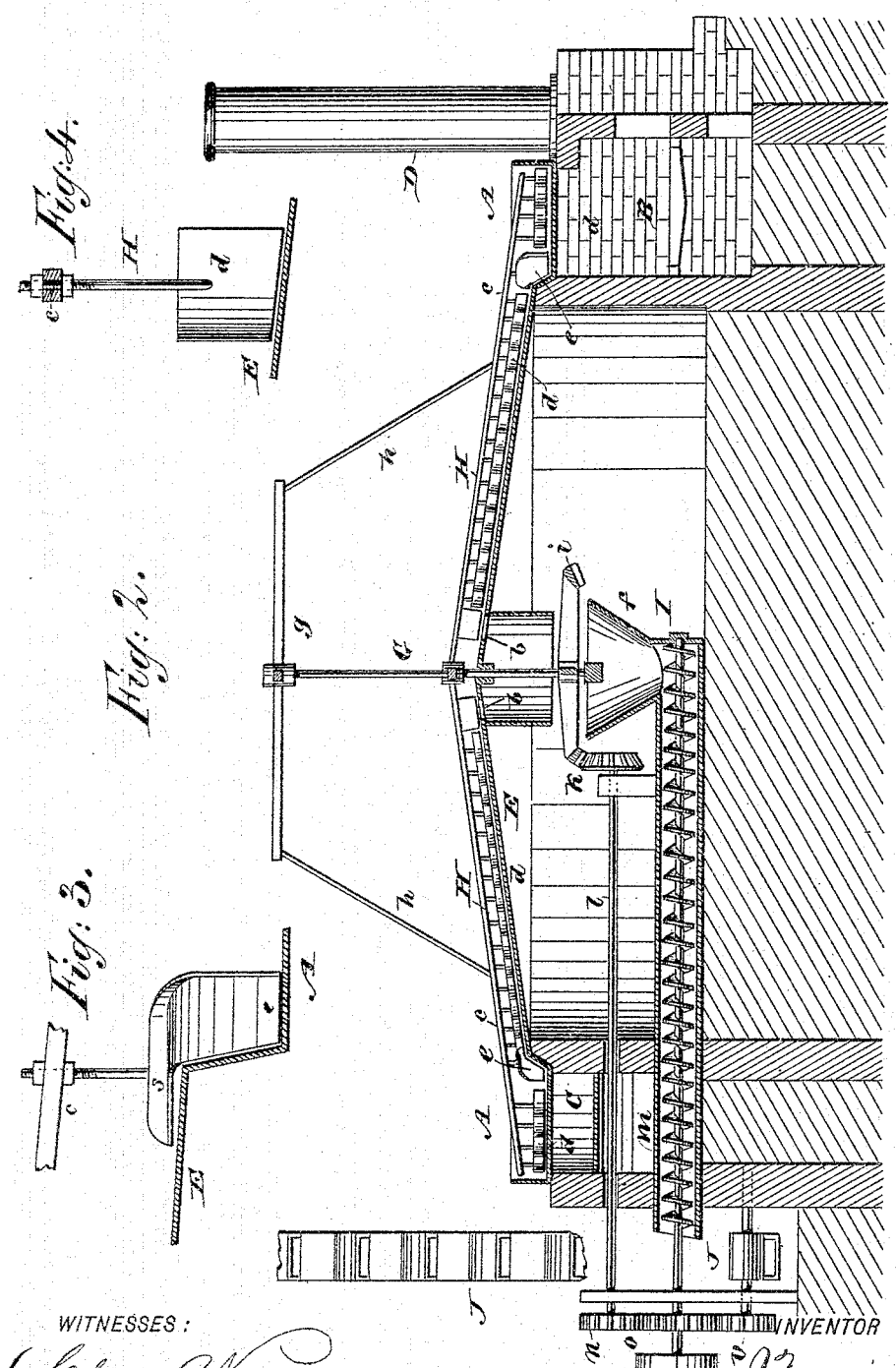

UNITED STATES PATENT OFFICE.

JOHN RUNCIMAN, OF GODERICH, CANADA.

APPARATUS FOR MANUFACTURING SALT.

SPECIFICATION forming part of Letters Patent No. 491,376, dated February 7, 1893.

Application filed April 6, 1892. Serial No. 427,975. (No model.)

*To all whom it may concern:*

Be it known that I, JOHN RUNCIMAN, of Goderich, in the Province of Ontario and Dominion of Canada, have invented a new and useful Improvement in Apparatus for the Manufacture of Salt, of which the following is a full, clear, and exact description.

This invention consists in an apparatus of novel construction, including certain devices pertaining thereto, substantially as hereinafter described and pointed out in the claims, for the manufacture of salt from the evaporation of brine in a suitably heated pan, and the raking, drying, conveying and storing or packing of it, whereby the formation of scale is prevented, fuel and labor are economized, and the drying of the salt and making it ready for grading and packing are expedited and much labor is saved.

Reference is to be had to the accompanying drawings forming a part of this specification, in which similar letters of reference indicate corresponding parts in all the figures.

Figure 1 is a plan view, in part, of an apparatus embodying my invention, with a portion of the brine pan and drying table broken away; Fig. 2 is a vertical section of said apparatus, upon the line 2—2 in Fig. 1; Fig. 3 is a further vertical section, in part, of the brine pan and drying table, with a plow or scoop for lifting the salt from the pan onto the drying table; and Fig. 4 another vertical section showing a part of the drying table, with one of the scrapers which work thereon.

A, is the evaporating pan into which the brine is introduced. This pan is of circular form constituting an annular trough, which shape provides for a continuous flow of the brine around it to equalize the heat that is applied to it and so prevent scale from forming on the pan which may be made of thin metal, thus economizing fuel. Said pan is represented as heated from beneath by a furnace B, having a circular flue C, which extends wholly around under the pan and from which the heated gases escape as by a chimney D, or the pan may be similarly heated by steam to evaporate the brine. In concentric arrangement with this pan A and joining it on its inner margin is a drying table E, preferably inclined upward toward its center, or in other words having a conically rising surface, and provided at its central portion with a series of outlet apertures $b$, for the salt after it has been suitably worked upon said table.

G, is a rotating vertical shaft arranged to project up through the center of the table E and suitably supported by upper and lower bearings. This shaft serves to carry a series of rakes H, and to bring the same over the table E and within and around the pan A, said rakes being formed of inclined radial arms $c$, and numerous rake blades $d$, arranged one in advance of the other and made to occupy an oblique position relatively to or across said arms, so that when the rakes are rotated in common with the shaft G, in the direction indicated by the arrows $y$, they will have the tendency to work the salt toward the center of the table. Attached to the arms $c$ of these rakes where the same cross the junction of the pan A with the table E are plows or scoops $e$. Said rakes should be more or less elastic or a spring be applied to each of them so that they may adjust themselves to inequalities in the surface of the pan, in order that the salt in the brine may be raked out of said inequalities.

The salt formed or left by evaporation of the brine in the pan A is lifted out of the pan on to the the drying table E, firstly by means of those oblique rake blades $d$ which work within the pan and which work the salt toward the inner margin thereof adjacent to the table E, and secondly by the action of the plows or scoops $e$ which scoop it up onto the table, said plows being of suitable shape so that as they are rotated in common with the rakes H they will slide the salt up out of the pan on to the table E where it is pushed a little way from the edge of the table by a small arm $s$, on each plow. The salt is then gradually raked or worked up on over the table E by those blades $d$ of the revolving cluster of rakes H which lie over the table, said blades being set or adjusted to any desired obliquity for the purpose, and so as to give any desired speed of lift to the salt according to the degree to which it is desired to be dried. This causes the salt to be thoroughly dried and, being worked up toward the center of the table, it is ultimately passed from off the table E by the central apertures b therein and is delivered to or through a spout f, into a screw conveyer I, which carries it to an elevator J, of any suitable construction and that may be used to conduct it to the usual grading screens, from which it is conveyed to separate bins, where it may be packed in the ordinary way or by means of a revolving screw packer be packed in barrels by its own weight aided by the action of the screw packer, as is well understood.

Any suitable means or arrangement of means may be used to rotate the cluster of rakes H with their attached plows or scoops e, also the conveyer I, and to give the necessary motion to the elevator J, but, as here shown, the rakes which are supported by a harness consisting of a beam g, and rods h, connected with the shaft G, are rotated by a wheel i, on said shaft driven by a pinion k, upon a horizontal counter-shaft l, that passes through an arch m, in the flue C to protect the machinery from heat, and this counter-shaft l receives its motion from the shaft of the screw conveyer I by a pinion n, gearing with a pinion o, that engages with another pinion v, to give motion to the elevator J; but of course this driving mechanism may be changed and the wheel i instead of being arranged above the screw conveyer may be placed below it if desired.

The arrows z in Fig. 1 indicate the direction of the heating gases passing from the furnace B and through the flue C to the chimney D.

By means of this apparatus, besides the advantages hereinbefore stated, nearly all or most of the usual manual labor required in the manufacture and putting up of the salt will be saved.

Having thus described my invention what I claim as new, and desire to secure by Letters Patent, is—

1. In apparatus for the manufacture of salt, the combination of an outer continuous and stationary annular evaporating pan or trough, means for heating said pan arranged to extend around and beneath it, and a drying table arranged to occupy a concentric position within or on the inside of the evaporating pan, substantially as specified.

2. The combination, of the annular evaporating pan or trough A, the concentric drying table E, arranged above the level of the bottom of said trough and having central outlet apertures b, and the series of rakes H, having oblique blades d, and arranged for rotation over and around said table, essentially as described.

3. In combination with the annular evaporating pan or trough A, and the concentric drying table E, having central outlet apertures b, the series of rakes H, having oblique blades d, and arranged to rotate over and around said table and within the pan, and the plows or scoops e, carried by said rakes, substantially as specified.

4. The improved apparatus for the manufacture of salt, comprising the annular evaporating pan or trough, the drying table arranged within and sloping or inclining upward and inward from said trough toward its center and having an outlet or discharge at such center, and mechanism whereby to transfer salt from the trough to the drying table and work it up the latter to the central outlet or discharge, all substantially as and for the purpose set forth.

JOHN RUNCIMAN.

Witnesses:
W. J. PASMORE,
J. C. WILLIAMS.